Jan. 26, 1926.
A. H. GIBSON
1,571,156
SNUBBER FOR VEHICLES
Filed July 13, 1923
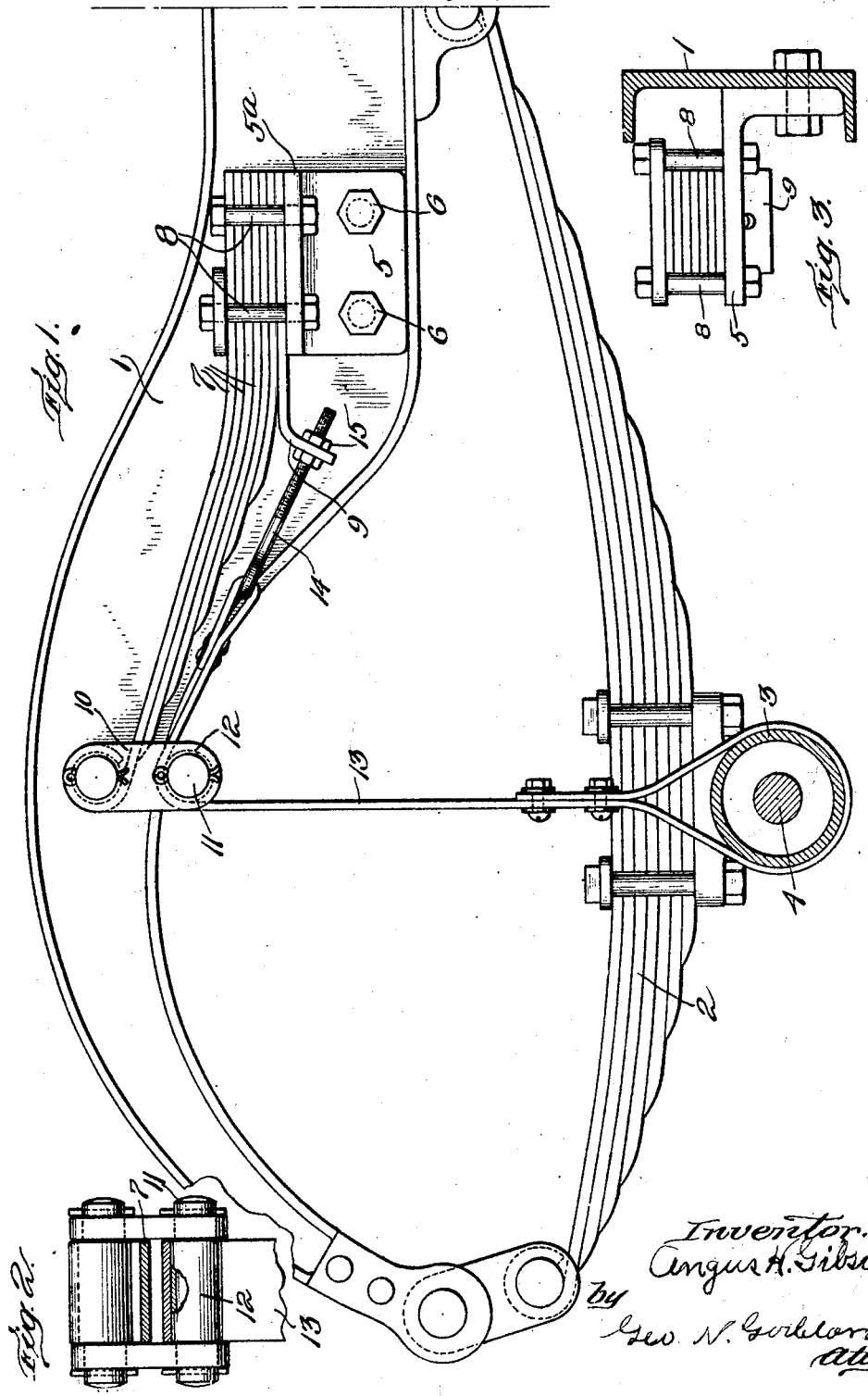

Patented Jan. 26, 1926.

1,571,156

UNITED STATES PATENT OFFICE.

ANGUS H. GIBSON, OF SALT LAKE CITY, UTAH, ASSIGNOR TO GIBSON PRODUCTS CO., OF SALT LAKE CITY, UTAH, A CORPORATION OF UTAH.

SNUBBER FOR VEHICLES.

Application filed July 13, 1923. Serial No. 651,266.

*To all whom it may concern:*

Be it known that I, ANGUS H. GIBSON, a citizen of the United States, and resident of Salt Lake City, in the county of Salt Lake and State of Utah, have invented certain new and useful Improvements in Snubbers for Vehicles, of which the following is a specification.

This invention relates to vehicles of the motor car type, and is intended to provide means for checking the rebound of the body after the supporting springs have been compressed by sudden road shocks, and also to make a car ride more easy when the rear seat is unoccupied.

The device embodies certain principles of construction and arrangement by which the tension of the snubber or anti-rebound member is supported to minimize a sudden shock or jolt when it begins to function, while at the same time distributing the strain longitudinally of the car frame or body and utilizing a conveniently placed leaf spring to effect the desired spring resistance to the rebound or lifting of the car body. To this end the invention comprises a flexible snubber adapted to be operatively connected with the axle housing of a motor car and intermediately suspended from a movable or swinging support with its other end adjustably anchored to the car frame. The arrangement is such that the adjustment can be quickly and conveniently made while being absolutely reliable and positive so that there is no inconvenience in adjusting the tension for service when a car is driven with no load in the rear, a condition which notoriously makes for rebound and discomfort in riding.

In the accompanying drawings I have illustrated a preferred construction and arrangement embodying the principles of this invention, in which:

Figure 1 is a side elevation illustrating my improved snubber applied to the rear end of a motor car of the usual construction.

Figure 2 is a detail showing in front elevation the suspension member for flexibly supporting the flexible snubber member or strap.

Figure 3 is a detail of the snubber spring-supporting bracket attached to a side frame of the car.

In the drawings the frame 1, the body-supporting spring 2, the axle housing 3 and the shaft 4, are of usual or suitable construction.

Between the line of the axle and the middle portion lengthwise of the car I secure an angle bracket 5, to the side face or web of the car frame by means of suitable bolts 6. On the horizontal member $5^a$ of the snubber spring-supporting bracket I secure the leaves 7 forming the shock-resisting or snubber spring by means of anchoring bolts 8, passed through said springs and through the lateral wing $5^a$ of the attaching bracket. A short anchoring bar 9, with its projecting end turned downwardly is also secured to said bracket, preferably below the lowermost leaf of the snubber, and is perforated to receive the anchoring member of the snubber strap.

At the free end of the snubber strap 7, is carried a pivoted shackle 10, around whose lower pin 11, is preferably placed a roller 12 which is free to turn under the movement of the flexible snubber element 13, which is in the form of a heavy strap whose lower end is looped around the axle housing or otherwise secured thereto, and whose intermediate portion passes through the pivotal shackle 10 over the roller 12, and is secured to an adjustable attaching member 14 in the form of an eye-bolt which passes through the downwardly turned end of the anchorage bar 9, and is adjustably anchored thereto by means of opposed nuts 15 arranged on opposite sides of the bar 9.

It will be seen that when the car body moves downward under a sudden shock the flexible snubber strap 13, is relaxed and offers no acceleration to the downward movement. When the car body and car spring return to normal position, however, the snubber becomes taut and exerts a gradually increasing resistance to the upward movement of the car since, with such flexing movement, each successive leaf of the snubber spring 7 is brought into play. By means of the suspension member or shackle engaging the intermediate portion of the strap and forming a pivotal connection with the free end of the snubber spring, the resistance of the snubber spring to the upward movement is applied without sudden shock but with gradually increasing force since the first tendency of the suspension member 10 is to swing toward the anchorage 9 for the upper end of the snubber strap. The stress at the anchorage point is applied longitudinally of the car. The adjustment of the anchorage nuts 15, is so easily made that when the car is to be driven with the rear portion of the body empty these nuts can be quickly set to put additional snubbing tension on the rear end of the car to take the place of a normal load in the rear end. It will be obvious that the device can be very conveniently applied to existing motor cars since the only machine work of any kind required on the car itself is merely the drilling of the holes for the attaching bolts 6. The arrangement is such that the intermediate portion of the snubber strap acts on a spring-resistance located directly above the axle although the connection with such spring-resistance is such as to avoid transmitting a sudden shock or blow which contributes greatly to the easy riding of the car.

For descriptive purposes the body-supporting structure, carried by the forward and rear axles, may be regarded as the axle element of the car, while the body frame supported on springs may be regarded as the spring element of the car. The strap-supporting shackle, whether with or without a roller, obviously serves as a pulley allowing the intermediate portion of the strap the requisite amount of travel when the snubber spring functions through the medium of the pivoted shackle.

What I claim is:

1. A snubber device for motor cars embracing in its construction a leaf spring secured to the car frame, a shackle pivotally supported by the free end of said spring, a flexible snubber element positively anchored at its opposite ends to the axle housing and to the body frame respectively and intermediately supported by said shackle to travel relative thereto, substantially as described.

2. A snubber device for a motor car embracing a snubber spring secured to the spring-supported body frame with its free end above the axle-housing, a flexible snubber strap anchored against longitudinal movement to the axle housing at one end and to the body frame at its other end, and a pivotal member forming a swingable connection between the free end of the snubber spring and the intermediate portion of the strap, substantially as described.

3. A snubber device for a motor car embracing a rebound resisting flexible strap positively anchored at both ends to form a connection adjustable as to length between a spring-supported body element and an axle element of the car, a snubber spring arranged to exert a yielding resistance to the upward movement of the spring-supported element by a pull exerted against both anchorages of said strap by an intermediate pulley connection with said strap, substantially as described.

4. In a snubber device for a motor car the combination of a bracket secured to the body frame, a snubber spring anchored thereto, a pivotal strap-supporting member mounted on the free end of said spring to act as a pulley, a snubber strap looped around the axle housing of the car and adjustably anchored to said bracket by a screw threaded extension, the intermediate portion of the strap being supported by said pulley connection with the snubber spring, substantially as described.

In witness whereof, I have subscribed the above specification.

ANGUS H. GIBSON.